(12) United States Patent
Fujita et al.

(10) Patent No.: US 10,768,473 B2
(45) Date of Patent: Sep. 8, 2020

(54) PRESSURE-SENSITIVE-ADHESIVE COMPOSITION, PRESSURE-SENSITIVE-ADHESIVE LAYER, PRESSURE-SENSITIVE-ADHESIVE-LAYER-ATTACHED POLARIZING FILM, AND IMAGE DISPLAY DEVICE

(71) Applicant: NITTO DENKO CORPORATION, Ibaraki-shi, Osaka (JP)

(72) Inventors: Masakuni Fujita, Ibaraki (JP); Tomoyuki Kimura, Ibaraki (JP); Yuusuke Toyama, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 0 days.

(21) Appl. No.: 15/563,163

(22) PCT Filed: Mar. 23, 2016

(86) PCT No.: PCT/JP2016/059183
§ 371 (c)(1),
(2) Date: Sep. 29, 2017

(87) PCT Pub. No.: WO2016/158609
PCT Pub. Date: Oct. 6, 2016

(65) Prior Publication Data
US 2018/0086953 A1 Mar. 29, 2018

(30) Foreign Application Priority Data
Mar. 31, 2015 (JP) .................................. 2015-072731

(51) Int. Cl.
*G02F 1/1335* (2006.01)
*B32B 7/02* (2019.01)
(Continued)

(52) U.S. Cl.
CPC .......... *G02F 1/133528* (2013.01); *B32B 7/02* (2013.01); *B32B 7/12* (2013.01);
(Continued)

(58) Field of Classification Search
CPC ............... C09J 133/08; C09J 2203/318; C09J 2433/00; C09J 7/385; G02F 1/133528;
(Continued)

(56) References Cited

U.S. PATENT DOCUMENTS

| | | | |
|---|---|---|---|
| 6,277,481 B1 | 8/2001 | Sugino et al. | |
| 2008/0023132 A1* | 1/2008 | Sano ........................ | C09J 11/06 156/275.7 |

(Continued)

FOREIGN PATENT DOCUMENTS

| | | |
|---|---|---|
| CN | 102888200 A | 1/2013 |
| CN | 104422979 A | 3/2015 |

(Continued)

OTHER PUBLICATIONS

Silicone Oligomers, pp. 6-7 of Silicones for Resin Modification [online], Shin-Etsu [retrieved on Aug. 12, 2018]. Retrieved from the Internet <URL: https://www.shinetsusilicone-global.com/catalog/pdf/ResinModification_e.pdf>. (Year: 2015).*

(Continued)

*Primary Examiner* — Sophie Hon
(74) *Attorney, Agent, or Firm* — Westerman, Hattori, Daniels & Adrian, LLP (57) ABSTRACT

An object of the present invention is to provide a pressure-sensitive-adhesive composition for forming a pressure-sensitive-adhesive layer capable of keeping a high endurance even when this layer is exposed to a heated environment or allowed to stand still for a long term. Another object of the invention is to provide a pressure-sensitive-adhesive layer formed from the pressure-sensitive-adhesive composition, a (Continued)

pressure-sensitive-adhesive-layer-attached polarizing film having the pressure-sensitive-adhesive layer, and an image display device including the pressure-sensitive-adhesive-layer-attached polarizing film. The composition is a pressure-sensitive-adhesive composition including a (meth) acryl-based polymer, and an oligomer epoxy-group-containing silane coupling agent having an epoxy equivalent of 250 to 600 g/mol.

7 Claims, 1 Drawing Sheet

(51) Int. Cl.
| | |
|---|---|
| B32B 27/00 | (2006.01) |
| G02B 5/30 | (2006.01) |
| C09J 133/00 | (2006.01) |
| C09J 7/38 | (2018.01) |
| B32B 7/12 | (2006.01) |
| B32B 27/06 | (2006.01) |
| C09J 133/08 | (2006.01) |
| C08K 5/5435 | (2006.01) |

(52) U.S. Cl.
CPC ............ *B32B 27/00* (2013.01); *B32B 27/06* (2013.01); *C09J 7/385* (2018.01); *C09J 133/00* (2013.01); *C09J 133/08* (2013.01); *G02B 5/30* (2013.01); *G02B 5/3025* (2013.01); *G02B 5/3033* (2013.01); *B32B 2307/202* (2013.01); *B32B 2307/412* (2013.01); *B32B 2307/42* (2013.01); *C08K 5/5435* (2013.01); *C09J 2203/318* (2013.01); *C09J 2205/102* (2013.01); *C09J 2433/00* (2013.01); *G02F 2202/28* (2013.01); *Y10T 428/1041* (2015.01); *Y10T 428/1059* (2015.01); *Y10T 428/1077* (2015.01)

(58) Field of Classification Search
CPC .......... G02F 2202/28; Y10T 428/1041; Y10T 428/1059; Y10T 428/1068; Y10T 428/1073; Y10T 428/1077; B32B 2307/202; B32B 2307/412; B32B 2307/42; B32B 27/06; B32B 7/12
See application file for complete search history.

(56) References Cited

U.S. PATENT DOCUMENTS

| | | | | |
|---|---|---|---|---|
| 2009/0208741 | A1* | 8/2009 | Toyama | ............... C08G 18/10 428/355 AC |
| 2009/0233093 | A1 | 9/2009 | Toyama et al. | |
| 2011/0181813 | A1 | 7/2011 | Kim et al. | |
| 2012/0121824 | A1* | 5/2012 | Toyama | ............. C08G 18/4866 428/1.52 |
| 2013/0141786 | A1* | 6/2013 | Jeong | ..................... C09J 133/12 359/485.01 |
| 2014/0073733 | A1 | 3/2014 | Yokokura et al. | |
| 2015/0070603 | A1 | 3/2015 | Yamasaki et al. | |
| 2016/0130478 | A1 | 5/2016 | Nagata et al. | |

FOREIGN PATENT DOCUMENTS

| | | | |
|---|---|---|---|
| JP | 9-269507 | A | 10/1997 |
| JP | 2009-192797 | A | 8/2009 |
| JP | 2009-242767 | A | 10/2009 |
| JP | 2011-190302 | A | 9/2011 |
| JP | 2012-102293 | A | 5/2012 |
| JP | 2012-242473 | A | 12/2012 |
| JP | 2013-10836 | A | 1/2013 |
| JP | 2013010836 | A * | 1/2013 |
| JP | 2013-101281 | A | 5/2013 |
| JP | 2013-151640 | A | 8/2013 |
| JP | 2014-160246 | A | 9/2014 |
| JP | 2015-025118 | A | 2/2015 |
| JP | 2015-28138 | A | 2/2015 |
| JP | 2015-44942 | A | 3/2015 |
| JP | 2016-44291 | A | 4/2016 |
| JP | 2016-190996 | A | 11/2016 |
| KR | 10-2000-0011479 | A | 2/2000 |
| KR | 10-2013-0002264 | A | 1/2013 |
| KR | 10-2013-0078599 | A | 7/2013 |
| WO | 2012/026456 | A1 | 3/2012 |
| WO | WO 2013055015 | A1 * | 4/2013 ............ C09J 133/08 |

OTHER PUBLICATIONS

Notification of Reasons for Refusal dated Nov. 14, 2016, issued in counterpart Japanese application No. 2015-072731, with English translation (4 pages).
Notification of Reasons for Refusal dated Mar. 10, 2017, issued in counterpart Japanese application No. 2015-072731, with English translation (6 pages).
Decision to Grant a Patent dated Jun. 27, 2017, issued in counterpart Japanese application No. 2015-072731, with English translation (5 pages).
International Search Report dated Jun. 7, 2016, issued in counterpart International Application No. PCT/JP2016/059183 (2 pages).
Submission of Information dated Jan. 16, 2017, issued in counterpart Japanese application No. 2015-072731, with English translation (28 pages).
Submission of Information dated Jan. 30, 2017, issued in counterpart Japanese application No. 2015-072731, with English translation (23 pages).
International Preliminary Report on Patentability (Form PCT/IB/338) issued in counterpart International Application No. PCT/JP2016/059183 dated Oct. 12, 2017, with Form PCT/IB/373 and Form PCT/ISA/237 (13 pages).
Office Action dated Nov. 10, 2017, issued in Korean Application No. 10-2017-7024242, with English translation (9 pages).
Office Action dated Apr. 9, 2018, issued in Japanese Patent Application No. JP2017-141687, with translation.
Office Action dated Mar. 8, 2018, issued in Chinese Patent Application No. 201680017605.9, with translation.
Office Action dated Jul. 30, 2018, issued in Chinese Patent Application No. 201680017605.9, with English translation.
Notice of Final Rejection dated Jun. 25, 2018, issued in Korena Application No. 10-2017-7024242, with translation.
Office Action dated Nov. 30, 2018, issued in counterpart Korean application 10-2018-7033468, with English translation. (7 pages).
Office Action dated Jan. 17, 2019, issued in counterpart CN Application No. 201680017605.9, with English translation (10 pages).
Office Action dated Jun. 13, 2019, issued in Taiwaneese Patent Application No. 105109754 with English translation.
Decision for Grant of Patent dated Aug. 20, 2019, issued in Korean Patent Application No. 10-2018-7033468, with English translation.

* cited by examiner

PRESSURE-SENSITIVE-ADHESIVE COMPOSITION, PRESSURE-SENSITIVE-ADHESIVE LAYER, PRESSURE-SENSITIVE-ADHESIVE-LAYER-ATTACHED POLARIZING FILM, AND IMAGE DISPLAY DEVICE

TECHNICAL FIELD

The present invention relates to a pressure-sensitive-adhesive composition, and a pressure-sensitive-adhesive layer formed from the pressure-sensitive-adhesive composition. The present invention also relates to a pressure-sensitive-adhesive-layer-attached polarizing film having the pressure-sensitive-adhesive layer, and an image display device including the pressure-sensitive-adhesive-layer-attached polarizing film.

BACKGROUND ART

In a liquid crystal panel used in a liquid crystal display device or some other device, a polarizing film is usually laminated onto each of both sides of a liquid crystal cell, which is composed of a liquid crystal layer arranged between a pair of transparent substrates, to interpose a pressure-sensitive-adhesive layer between the cell and the polarizing film. Such a pressure-sensitive-adhesive layer is required to have a high endurance. For example, in an endurance test under heating and humidifying conditions, which is usually made as an environment accelerating test, the polarizing film is required not to undergo the generation of a peel or a lift, or other defects caused by the pressure-sensitive-adhesive layer.

Such pressure-sensitive-adhesive compositions for optical use have been variously investigated. Suggested is, for example, a pressure-sensitive-adhesive composition about which even when an optical film is bonded to the composition and subsequently the resultant is put into high-temperature and high-humidity conditions, the optical film is not peeled or formed (see, for example, Patent Document 1).

PRIOR ART DOCUMENT

Patent Document

Patent Document 1: JP-A-2009-242767

SUMMARY OF THE INVENTION

Problems to be Solved by the Invention

About two transparent substrates of a liquid crystal cell as a constituent of a liquid crystal panel, a transparent conductive coating, such as an indium tin oxide (ITO) thin film, maybe formed on one of the transparent substrates. In any pressure-sensitive-adhesive layer contacting this transparent conductive coating, a peel, a lift, and others are more easily generated than in any pressure-sensitive-adhesive layer contacting a transparent substrate such as a glass substrate, so that the pressure-sensitive-adhesive layer tends to be lowered in endurance.

Moreover, the pressure-sensitive-adhesive layer may be used after stored for a long term of 6 months or longer. Thus, this layer is required to have an excellent endurance even after the long-term storage.

In the case of bonding a pressure-sensitive-adhesive layer formed from the pressure-sensitive-adhesive composition in Patent Document 1 to a transparent conductive coating, this layer is not sufficient in heating endurance.

Thus, an object of the present invention is to provide a pressure-sensitive-adhesive composition for forming a pressure-sensitive-adhesive layer capable of keeping a high endurance even when this layer is exposed to a heated environment or allowed to stand still for a long term. Another object of the present invention is to provide a pressure-sensitive-adhesive layer formed from the pressure-sensitive-adhesive composition, a pressure-sensitive-adhesive-layer-attached polarizing film having the pressure-sensitive-adhesive layer, and an image display device including the pressure-sensitive-adhesive-layer-attached polarizing film.

Means for Solving the Problems

In order to solve the problems, the present inventors have repeatedly made eager investigations to find out a pressure-sensitive-adhesive composition described below. Thus, the present invention has been achieved.

The present invention relates to a pressure-sensitive-adhesive composition, including a (meth)acryl-based polymer, and an oligomer epoxy-group-containing silane coupling agent having an epoxy equivalent of 250 to 600 g/mol.

In the invention, the silane coupling agent preferably has, in molecule thereof, two or more alkoxysilyl groups.

In the invention, the blend amount of the silane coupling agent is preferably from 0.01 to 3 parts by weight for 100 parts by weight of the (meth)acryl-based polymer.

In the invention, the (meth)acryl-based polymer preferably includes, as monomer units thereof, an alkyl (meth)acrylates, and two or more monomers selected from the group consisting of a carboxyl-group-containing monomer, a hydroxyl-group-containing monomer and an amide-group-containing monomers, more preferably, the (meth)acryl-based polymer includes, as the monomer units, the alkyl (meth)acrylate, the carboxyl-group-containing monomer, the hydroxyl-group-containing monomer, and the amide-group-containing monomer.

The pressure-sensitive-adhesive composition of the present invention is preferably used for a pressure-sensitive-adhesive-composition forming the pressure-sensitive-adhesive composition, together with a transparent conductive substrate having a transparent conductive layer and a transparent substrate, in the state of being bonded to the transparent conductive layer.

The present invention also relates to a pressure-sensitive-adhesive layer, which is formed from the pressure-sensitive-adhesive composition.

The present invention also relates to a pressure-sensitive-adhesive-layer-attached polarizing film, having a polarizing film and the pressure-sensitive-adhesive layer. The pressure-sensitive-adhesive-layer-attached polarizing film is preferably used, together with a transparent conductive substrate having a transparent conductive layer and a transparent substrate, in the state of being bonded to the transparent conductive layer.

The present invention also relates to an image display device, including: the pressure-sensitive-adhesive-layer-attached polarizing film; and a liquid crystal cell including a transparent conductive substrate having a transparent conductive layer and a transparent substrate;
wherein the pressure-sensitive-adhesive layer of the pressure-sensitive-adhesive-layer-attached polarizing film is bonded to the transparent conductive layer of the liquid crystal cell.

Effect of the Invention

The pressure-sensitive-adhesive composition of the present invention makes it possible to form a pressure-sensitive-adhesive layer capable of keeping a high endurance even when this layer is exposed to a heated environment or allowed to stand still for a long term. Furthermore, the present invention makes it possible to provide a pressure-sensitive-adhesive layer formed from the pressure-sensitive-adhesive composition, a pressure-sensitive-adhesive-layer-attached polarizing film having the pressure-sensitive-adhesive layer, and an image display device including the pressure-sensitive-adhesive-layer-attached polarizing film.

MODE FOR CARRYING OUT THE INVENTION

1. Pressure-Sensitive-Adhesive Composition

The pressure-sensitive-adhesive composition of the present invention includes a (meth)acryl-based polymer, and an oligomer epoxy-group-containing silane coupling agent having an epoxy equivalent of 250 to 600 g/mol. Hereinafter, the pressure-sensitive-adhesive composition of the present invention will be described.

(1) (Meth)Acryl-Based Polymer

The pressure-sensitive-adhesive composition of the present invention includes a (meth)acryl-based polymer, and an oligomer epoxy-group-containing silane coupling agent having an epoxy equivalent of 250 to 600 g/mol. The composition preferably includes the (meth)acryl-based polymer as a main component. The main component denotes, out of entire solid components included in the pressure-sensitive-adhesive composition, a component the content by percentage of which in the composition is the largest. The main component denotes, out of the entire solid components included in the pressure-sensitive-adhesive composition, for example, a component the content by percentage of which in the composition is more than 50% by weight, and further, more than 70% by weight.

The (meth)acryl-based polymer usually includes, as a main component thereof, an alkyl (meth)acrylate for monomer units of the polymer. The wording "(meth)acrylate" denotes acrylate and/or methacrylate. In the present invention, the wording "(meth)a" has the same meaning.

The alkyl (meth)acrylate, which constitutes a main skeleton of the (meth)acryl-based polymer, is, for example, a (meth)acrylate having a linear or branched alkyl group having 1 to 18 carbon atoms. Examples of the alkyl group include methyl, ethyl, propyl, isopropyl, butyl, isobutyl, amyl, hexyl, cyclohexyl, heptyl, 2-ethylhexyl, isooctyl, nonyl, decyl, isodecyl, dodecyl, isomyristyl, lauryl, tridecyl, pentadecyl, hexadecyl, heptadecyl, and octadecyl groups. These groups may be used singly or in any combination. The average number of carbon atoms in these alkyl groups is preferably from 3 to 9.

A monomer other than the alkyl (meth)acrylate, as a constituent for the (meth)acryl-based polymer, is, for example, a carboxyl-group-containing monomer, a hydroxyl-group-containing monomer, an amide-group-containing monomer, or an aromatic-ring-containing (meth)acrylate.

The carboxyl-group-containing monomer is a compound containing, in the structure thereof, a carboxyl group, and further containing therein a polymerizable unsaturated double bond of, for example, a (meth)acryloyl group or vinyl group. Specific examples of the carboxyl-group-containing monomer include (meth)acrylic acid, carboxylethyl (meth)acrylate, carboxylpentyl (meth)acrylate, itaconic acid, maleic acid, fumaric acid, and crotonic acid. Out of these carboxyl-group-containing monomers, acrylic acid is preferred from the viewpoint of the copolymerizability and costs thereof, and adhesive properties of the resultant pressure-sensitive-adhesive composition.

The hydroxyl-group-containing monomer is a compound containing, in the structure thereof, a hydroxyl group, and further containing therein a polymerizable unsaturated double bond of, for example, a (meth)acryloyl group or vinyl group. Specific examples of the hydroxyl-group-containing monomer include hydroxyalkyl (meth)acrylates such as 2-hydroxyethyl (meth)acrylate, 3-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, and 12-hydroxylauryl (meth)acrylate; and (4-hydroxymethylcyclohexyl)-methyl acrylate. Out of these hydroxyl-group-containing monomers, preferred are 2-hydroxyethyl (meth)acrylate, and 4-hydroxybutyl (meth)acrylate, and particularly preferred is 4-hydroxybutyl (meth)acrylate from the viewpoint of the endurance of the resultant pressure-sensitive-adhesive layer.

The amide-group-containing monomer is a compound containing, in the structure thereof, an amide group, and further containing therein a polymerizable unsaturated double bond of, for example, a (meth)acryloyl group or vinyl group. Specific examples of the amide-group-containing monomer include (meth)acrylamide based monomers such as (meth)acrylamide, N,N-dimethyl(meth)acrylamide, N,N-diethyl(meth)acrylamide, N-isopropyl acrylamide, N-methyl(meth)acrylamide, N-butyl(meth)acrylamide, N-hexyl(meth)acrylamide, N-methylol(meth)acrylamide, N-methylol-N-propane(meth)acrylamide, aminomethyl (meth)acrylamide, aminoethyl(meth)acrylamide, mercaptomethyl(meth)acrylamide, and mercaptoethyl(meth)acrylamide; N-acryloyl heterocyclic monomers such as N-(meth)acryloylmorpholine, N-(meth)acryloylpiperidine, and N-(meth)acryloylpyrrolidine; and N-vinyl-group-containing lactam monomers such as N-vinylpyrrolidone and N-vinyl-ε-caprolactam. The amide-group-containing monomer is preferred for causing the pressure-sensitive-adhesive layer to satisfy endurance. Out of such amide-group-containing monomers, N-vinyl-group-containing lactam monomer is preferred to cause the pressure-sensitive-adhesive layer to satisfy endurance for the transparent conductive layer.

The aromatic-ring-containing (meth)acrylate is a compound containing, in the structure thereof, an aromatic ring structure, and further containing a (meth)acryloyl group. Examples of the aromatic ring include a benzene ring, a naphthalene ring, and a biphenyl ring. The aromatic-ring-containing (meth)acrylate can cause the pressure-sensitive-adhesive layer to satisfy endurance (particularly, endurance for the transparent conductive layer).

Specific examples of the aromatic-ring-containing (meth)acrylate include aromatic-ring-containing (meth)acrylates each having a benzene ring, such as benzyl (meth)acrylate, phenyl (meth)acrylate, o-phenylphenol (meth)acrylate, phenoxy (meth)acrylate, phenoxyethyl (meth)acrylate, phenoxypropyl (meth)acrylate, phenoxydiethylene glycol (meth)acrylate, ethylene oxide modified nonylphenol (meth)acrylate, ethylene oxide modified cresol (meth)acrylate, phenol ethylene oxide modified (meth)acrylate, 2-hydroxy-3-phenoxypropyl (meth)acrylate, methoxybenzyl (meth)acrylate, chlorobenzyl (meth)acrylate, cresyl (meth)acrylate, and polystyryl (meth)acrylate; aromatic-ring-containing (meth)acrylates each having a naphthalene ring, such as hydroxyethylated β-naphthol acrylate, 2-naphthoethyl (meth)acrylate, 2-naphthoxyethyl acrylate, and 2-(4-methoxy-1-naphthoxy)ethyl (meth)acrylate; and aromatic-ring-containing (meth)acrylates each having a biphenyl ring, such as biphenyl (meth)acrylate.

When the pressure-sensitive-adhesive composition contains a crosslinking agent, the carboxyl-group-containing monomer, hydroxyl-group-containing monomer, amide-group-containing monomer, and aromatic-ring-containing (meth)acrylate each become reaction points with the crosslinking agent. In particular, the carboxyl-group-containing monomer and hydroxyl-group-containing monomer are preferably used since the monomers are each rich in reactivity with an intermolecular crosslinking agent to improve the resultant pressure-sensitive-adhesive layer in cohesive property and heat resistance. These monomers maybe used in any combination of two or more thereof different from each other in kind. It is preferred to use, particularly, two or more monomers that are different from each other in kind that are selected from the group consisting of the carboxyl-group-containing monomer, the hydroxyl-group-containing monomer, and the amide-group-containing monomer. It is especially preferred to use three kinds of the carboxyl-group-containing monomer, the hydroxyl-group-containing monomer, and the amide-group-containing monomer together. A reason therefor is that the combination of these monomers makes it possible to improve the resultant pressure-sensitive adhesive in long-term endurance.

It is preferred that the (meth)acryl-based polymer used in the present invention includes, for its monomer units, each of the above-mentioned monomers in a proportion described below by weight of the entire constituent monomers (100% by weight).

The proportion by weight of the alkyl (meth)acrylate is set as the proportion of the remaining monomer except the monomers other than the alkyl (meth)acrylate. Specifically, the proportion is preferably 70% or more by weight. In order to cause the pressure-sensitive adhesive to ensure adhesion, it is preferred to set the proportion by weight of the alkyl (meth)acrylate into this range.

The proportion by weight of the carboxyl-group-containing monomer is preferably 2% or less by weight, more preferably from 0.01 to 2% by weight, even more preferably from 0.05 to 1.5% by weight, even more preferably from 0.05 to 1% by weight, in particular preferably from 0.05 to 0.5% by weight. If the proportion by weight of the carboxyl-group-containing monomer is less than 0.01% by weight, the tendency is generated that the pressure-sensitive-adhesive layer fails to satisfy endurance. In the meantime, if the proportion is more than 2% by weight, the tendency is generated that the pressure-sensitive-adhesive layer unfavorably comes to fail to satisfy endurance.

The proportion by weight of the hydroxyl-containing monomer is preferably 3% or less by weight, more preferably from 0.01 to 3% by weight, even more preferably from 0.1 to 2% by weight, in particular preferably from 0.2 to 2% by weight. If the proportion by weight of the hydroxyl-containing monomer is less than 0.01% by weight, the pressure-sensitive-adhesive layer becomes insufficient in being crosslinked so that the layer tends to fail to satisfy endurance and adhesive properties. In the meantime, if the proportion is more than 3% by weight, the layer tends to fail to satisfy endurance.

The proportion by weight of the amide-group-containing monomer is preferably 8% or less by weight, more preferably from 0.1 to 8% by weight, even more preferably from 0.3 to 5% by weight, even more preferably from 0.3 to 4% by weight, in particular preferably from 0.7 to 2.5% by weight. If the proportion by weight of the amide-group-containing monomer is less than 0.1% by weight, the pressure-sensitive-adhesive layer tends to fail to satisfy endurance, particularly, for the transparent conductive layer. In the meantime, if the proportion is more than 8% by weight, the pressure-sensitive-adhesive layer unfavorably tends to be lowered in endurance.

The proportion by weight of the aromatic-ring-containing (meth)acrylate is preferably 25% or less by weight, more preferably from 0 to 22% by weight, even more preferably from 0 to 18% by weight. If the proportion by weight of the aromatic-ring-containing (meth)acrylate is more than 25% by weight, the pressure-sensitive-adhesive layer tends to be lowered in endurance.

It is unnecessary for the (meth)acryl-based polymer to contain, particularly, a monomer unit other than the above-mentioned monomer units. It is however possible to incorporate, into the polymer, one or more copolymerizable monomers having a polymerizable functional group having an unsaturated double bond, such as a (meth)acryloyl group or vinyl group, to improve the pressure-sensitive-adhesive layer in adhesion or heat resistance.

About the proportion of the copolymerizable monomer(s) in the (meth)acryl-based polymer, the proportion by weight of the copolymerizable monomer(s) is preferably from about 0 to 10% by weight, more preferably from about 0 to 7% by weight, even more preferably from about 0 to 5% by weight of the entire constituent monomers (100% by weight) of the (meth)acryl-based polymer.

The (meth)acryl-based polymer in the present invention is usually a polymer having a weight-average molecular weight of 1,000,000 to 2,500,000. The weight-average molecular weight is preferably from 1,200,000 to 2,000,000, considering the endurance, in particular, the heat resistance of the pressure-sensitive-adhesive layer. If the weight-average molecular weight is less than 1,000,000, the polymer is unfavorable from the viewpoint of heat resistance. If the weight-average molecular weight is more than 2,500,000, the pressure-sensitive adhesive tends to become hard easily so that a member bonded through this adhesive is easily peeled off. The "weight-average molecular weight (MW)"/ "number-average molecular weight (Mn)" ratio, which shows the molecular weight distribution of the polymer, is preferably from 1.8 or more to 10 or less, more preferably from 1.8 to 7, even more preferably from 1.8 to 5. If the molecular weight distribution (Mw/Mn) is more than 10, the pressure-sensitive-adhesive layer is unfavorable from the viewpoint of endurance. The weight-average molecular weight and the molecular weight distribution (Mw/Mn) are each gained from a value obtained by measuring the polymer by GPC (gel permeation chromatography) and then calculating the molecular weight of the polymer in terms of polystyrene.

Such a (meth)acryl-based polymer may be produced by a method selected appropriately from known production methods such as solution polymerization, bulk polymerization, emulsion polymerization and various radical polymerizations. The resultant (meth)acryl-based polymer may be any one of a random copolymer, a block copolymer, a graft copolymer and other polymers.

In the solution polymerization, as a polymerization solvent, for example, ethyl acetate or toluene is used. In a specific example of the solution polymerization, reaction is performed in the presence of an added polymerization initiator in an inert gas, such as nitrogen, ordinarily under reaction conditions of a temperature of about 50 to 70° C. and a period of about 5 to 30 hours.

A polymerization initiator, a chain transfer agent, an emulsifier and others that are used in the radical polymerizations are not particularly limited, and may be appropriately selected to be used. The weight-average molecular weight of the (meth)acryl-based polymer is controllable in accordance with the respective use amounts of the polymerization initiator and the chain transfer agent, and the reaction conditions. In accordance with the species of these agents, the use amounts thereof are appropriately adjusted.

Examples of the polymerization initiator include azo initiators such as 2,2'-azobisisobutyronitrile, 2,2'-azobis(2-amidinopropane) dihydrochloride, 2,2'-azobis[2-(5-methyl-2-imidazoline-2-yl)propane] dihydrochloride, 2,2'-azobis(2-methylpropionamidine) disulfate, 2,2'-azobis(N,N'-dimethyleneisobutylamidine), and 2,2'-azobis[N-(2-carboxyethyl)-2-methylpropionamidine] hydrate (trade name: VA-057, manufactured by Wako Pure Chemical Industries, Ltd.); persulfates such as potassium persulfate, and ammonium persulfate; peroxide initiators such as di(2-ethylhexyl) peroxydicarbonate, di(4-t-butylcyclohexyl) peroxydicarbonate, di-sec-butyl peroxydicarbonate, t-butyl peroxyneodecanoate, t-hexyl peroxypivalate, t-butyl peroxypivalate, dilauroyl peroxide, di-n-octanoyl peroxide, 1,1,3,3-tetramethylbutyl peroxy-2-ethylhexanoate, di(4-methylbenzoyl) peroxide, dibenzoyl peroxide, t-butyl peroxyisobutyrate, 1,1-di(t-hexylperoxy) cyclohexane, t-butyl hydroperoxide, and hydrogen peroxide; redox initiators, which are each a combination of a peroxide with a reducing agent, such as a combination of a persulfate with sodium hydrogensulfite, and a combination of a peroxide with sodium ascorbate. However, the polymerization initiator is not limited to these examples.

Such polymerization initiators may be used singly or in the form of a mixture of two or more thereof. The content of the whole of the initiator (s) is preferably from about 0.005 to 1 part by weight, more preferably from about 0.02 to 0.5 part by weight for 100 parts by weight of the entire monomer component(s).

In order to use, for example, 2,2'-azoisobutyronitrile as the polymerization initiator to produce a (meth)acryl-based polymer having a weight-average molecular weight in the above-mentioned range, the use amount of the polymerization initiator(s) is preferably from about 0.06 to 0.2 part by weight, more preferably from about 0.08 to 0.175 parts by weight for 100 parts by weight of the entire monomer component(s).

The chain transfer agent, the emulsifier, and other components may be used appropriately selected from conventionally known agents and components.

(2) Epoxy-Group-Containing Silane Coupling Agent

The present invention is characterized in that the pressure-sensitive-adhesive composition includes an oligomer epoxy-group-containing silane coupling agent having an epoxy equivalent of 250 to 600 g/mol. When the pressure-sensitive-adhesive composition includes the oligomer epoxy-group-containing silane coupling agent, which has an epoxy equivalent of 250 to 600 g/mol, a pressure-sensitive-adhesive layer formed from this pressure-sensitive-adhesive composition can be improved in endurance. Even when this layer is, in particular, exposed to a heated environment or allowed to stand still for a long term, the layer can keep a high endurance. The oligomer denotes a polymer within a scope from a dimer made from two units of a monomer to an approximate-100-merized body made from about 100 units thereof. The weight-average molecular weight of the oligomer silane coupling agent is preferably from about 300 to 30,000.

The epoxy equivalent of the epoxy-group-containing silane coupling agent is from 250 to 600 g/mol, preferably from 250 to 500 g/mol, even more preferably from 280 to 400 g/mol. When the epoxy equivalent of the epoxy-group-containing silane coupling agent is in the range, a pressure-sensitive-adhesive layer formed from the pressure-sensitive-adhesive composition can be improved in endurance. When the layer is, particularly, exposed to a heated environment or allowed to stand still for a long term, the layer can keep a high endurance.

The epoxy-group-containing silane coupling agent preferably has, in molecule thereof, two or more alkoxysilyl groups. The amount of the alkoxy groups in the epoxy-group-containing silane coupling agent is preferably from 10 to 60% by weight, more preferably from 20 to 50% by weight, even more preferably from 20 to 40% by weight of the silane coupling agent.

The species of the alkoxy groups is not limited. Examples thereof include alkoxy groups each having 1 to 6 carbon atoms, such as methoxy, ethoxy, propoxy, butoxy, pentyloxy, and hexyloxy. Out of these groups, methoxy and ethoxy are preferred, and methoxy is more preferred. The epoxy-group-containing silane coupling agent also preferably contains, in a single molecule thereof, both of methoxy and ethoxy.

In the present invention, it is preferred to use, as the epoxy-group-containing silane coupling agent, an oligomer epoxy-group-containing silane coupling agent having, in molecule thereof, two or more alkoxysilyl groups. Specific examples thereof include X-41-1059A (epoxy equivalent: 350 g/mol) and X-41-1056 (epoxy equivalent: 280 g/mol) each manufactured by Shin-Etsu Chemical Co., Ltd. About these coupling agents, the epoxy equivalent does not easily volatilize; and the agents each have plural alkoxysilyl groups. Thus, the agents are favorably effective for improving the endurance.

Epoxy-group-containing silane coupling agents as described above may be used singly or in the form of a mixture of two or more thereof. The content of the entire epoxy-group-containing silane coupling agent(s) is preferably from 0.01 to 6 parts by weight, more preferably from 0.01 to 3 parts by weight, even more preferably from 0.02 to 2 parts by weight, even more preferably from 0.05 to 1 part by weight, in particular preferably from 0.05 to 0.5 part by weight for 100 parts by weight of the (meth)acryl-based polymer. When the pressure-sensitive-adhesive composition includes the epoxy-group-containing silane coupling agent(s) in an amount in these ranges, a pressure-sensitive-adhesive layer formed from this composition can be improved in endurance. Even when this layer is particularly exposed to a heated environment or allowed to stand still for a long term, the layer can keep a high endurance.

A silane coupling agent other than the above-defined epoxy-group-containing silane coupling agent may be added to the pressure-sensitive-adhesive composition used in the present invention. Examples of the other coupling agent include amino-group-containing silane coupling agents such as 3-aminopropyltrimethoxysilane, N-2-(aminoethyl)-3-aminopropylmethyldimethoxysilane, 3-triethoxysilyl-N-(1, 3-dimethylbutylidene)propylamine, and N-phenyl-γ-aminopropyltrimethoxysilane; (meth)acryl-group-containing silane coupling agents such as 3-acryloxypropyltrimethoxysilane, and 3-methacryloxypropyltriethoxysilane; and isocyanate-group-containing silane coupling agents such as 3-isocyanatepropyltriethoxysilane.

The silane coupling agent other than the above-defined epoxy-group-containing silane coupling agent may be added to the composition as far as the agent does not damage the advantageous effects of the present invention. The addition amount thereof is not particularly limited.

(3) Crosslinking Agent

The pressure-sensitive-adhesive composition used in the present invention preferably includes a crosslinking agent. The crosslinking agent may be an organic crosslinking agent, or a polyfunctional metal chelate. Examples of the organic crosslinking agent include isocyanate based, peroxide based, epoxy based, and imine based crosslinking agents. The polyfunctional metal chelate is a compound in which a polyvalent metal is covalently bonded or coordinate-bonded to an organic compound. Examples of the atom of the polyvalent metal include Al, Cr, Zr, Co, Cu, Fe, Ni, V, Zn, In, Ca, Mg, Mn, Y, Ce, Sr, Ba, Mo, La, Sn, and Ti. An atom in the organic compound to which the metal is covalently bonded or coordinate-bonded is, for example, an oxygen atom. Examples of the organic compound include alkyl esters, alcohol compounds, carboxylic acid compounds, ether compounds, and ketone compounds.

As the crosslinking agent, an isocyanate based crosslinking agent and/or a peroxide based crosslinking agent is/are preferably used. A combination of an isocyanate based crosslinking agent with a peroxide based crosslinking agent is more preferably used.

The isocyanate based crosslinking agent may be a compound having at least two isocyanate groups. The crosslinking agent is, for example, a known aliphatic polyisocyanate, alicyclic polyisocyanate, or aromatic polyisocyanate that is ordinarily used in urethanization reaction.

Examples of the aliphatic polyisocyanate include trimethylene diisocyanate, tetramethylene diisocyanate, hexamethylene diisocyanate, pentamethylene diisocyanate, 1,2-propylene diisocyanate, 1,3-butylene diisocyanate, dodecamethylene diisocyanate, and 2,4,4-trimethylhexamethylene diisocyanate.

Examples of the alicyclic isocyanate include 1,3-cyclopentene diisocyanate, 1,3-cyclohexane diisocyanate, 1,4-cyclohexane diisocyanate, isophorone diisocyanate, hydrogenated diphenylmethane diisocyanate, hydrogenated xylylene diisocyanate, hydrogenated tolylene diisocyanate, and hydrogenated tetramethylxylylene diisocyanate.

Examples of the aromatic diisocyanate include phenylene diisocyanate, 2,4-tolylene diisocyanate, 2,6-tolylene diisocyanate, 2,2'-diphenylmethane diisocyanate, 4,4'-diphenylmethane diisocyanate, 4,4'-toluidine diisocyanate, 4,4'-diphenyl ether diisocyanate, 4,4'-diphenyl diisocyanate, 1,5-naphthalene diisocyanate, and xylylene diisocyanate.

Additional examples of the isocyanate based cross linking agent include respective multi-merized bodies (dimers, trimers and pentamers) of the above-mentioned diisocyanates; and urethane modified bodies obtained by causing an isocyanate to react with a polyhydric alcohol such as trimethylolpropane, urea modified bodies, biuret modified bodies, allophanate modified bodies, isocyanurate modified bodies, and carbodiimide modified bodies.

Examples of commercially available products of the isocyanate based crosslinking agent include products with trade names "MILLIONATE MT", "MILLIONATE MTL", "MILLIONATE MR-200", "MILLIONATE MR-400", "CORONATE L", "CORONATE HL" and "CORONATE HX" each manufactured Nippon Polyurethane Industry Co., Ltd; and products with trade names "TAKENATE D-110N", "TAKENATE D-120N", "TAKENATE D-140N", "TAKENATE D-160 N", "TAKENATE D-165N", "TAKENATE D-170HN", "TAKENATE D-178N", "TAKENATE 500", and "TAKENATE 600" each manufactured by Mitsui Chemicals, Inc. These compounds may be used singly or in the form of a mixture of two or more thereof.

As the isocyanate based crosslinking agent, preferred are any aliphatic polyisocyanate, and an aliphatic polyisocyanate type compound that is a modified body of the aliphatic polyisocyanate. The aliphatic polyisocyanate based compound is richer in crosslinked-structure flexibility than other isocyanate based crosslinking agents to relieve, with ease, stress in the pressure-sensitive-adhesive layer that follows the expansion/shrinkage of the optical film. Thus, the optical film is not easily peeled in an endurance test. The aliphatic polyisocyanate based compound is in particular preferably hexamethylene diisocyanate, and any modified body thereof.

As the peroxide, the following peroxide is appropriately usable: a peroxide which is heated or irradiated with light to generate active radical species, thereby advancing the crosslinkage of the base polymer ((meth)acryl-based polymer) of the pressure-sensitive-adhesive composition. A peroxide having a one-minute half-life temperature of 80 to 160° C. is preferably used, and a peroxide having a one-minute half-life temperature of 90 to 140° C. is more preferably used, considering the workability and the stability thereof.

Examples of the usable peroxide include di(2-ethylhexyl) peroxydicarbonate (one-minute half-life temperature: 90.6° C.), di(4-t-butylcyclohexyl) peroxydicarbonate (one-minute half-life temperature: 92.1° C.), di-sec-butyl peroxydicarbonate (one-minute half-life temperature: 92.4° C.), t-butyl peroxyneodecanoate (one-minute half-life temperature: 103.5° C.), t-hexylperoxypivalate (one-minute half-life temperature: 109.1° C.), t-butylperoxypivalate (one-minute half-life temperature: 110.3° C.), dilauroyl peroxide (one-minute half-life temperature: 116.4° C.), di-n-octanoyl peroxide (one-minute half-life temperature: 117.4° C.), 1,1,3,3-tetramethylbutyl peroxy-2-ethylhexanoate (one-minute half-life temperature: 124.3° C.), di(4-methylbenzoyl) peroxide (one-minute half-life temperature: 128.2° C.), dibenzoyl peroxide (one-minute half-life temperature: 130.0° C.), t-butyl peroxyisobutyrate (one-minute half-life temperature: 136.1° C.), and 1,1-di(t-hexylperoxy)cyclohexane (one-minute half-life temperature: 149.2° C.). Out of these examples, preferred are di(4-t-butylcyclohexyl) peroxydicarbonate (one-minute half-life temperature: 92.1° C.), dilauroyl peroxide (one-minute half-life temperature: 116.4° C.), and dibenzoyl peroxide (one-minute half-life temperature: 130.0° C.) since these compounds are excellent, especially in crosslinking reaction efficiency.

The half-life of a peroxide is an index representing the decomposition rate of the peroxide, and denotes a period until the remaining amount of the peroxide becomes half. Manufactures' catalogs and others describe the decomposition temperature of each of various peroxides at which the peroxide obtains a half-life of any period, and the half-life period of the peroxide at any temperature. For example, "ORGANIC PEROXIDES 9$^{th}$ version (May, 2003)" of NOF Corp. describes these factors.

The use amount of the crosslinking agent is preferably from 0.01 to 3 parts by weight, more preferably from 0.02 to 2 parts by weight, even more preferably from 0.03 to 1 part by weight for 100 parts by weight of the (meth)acryl-based polymer. If the amount is less than 0.01 part by weight, the pressure-sensitive-adhesive layer becomes insufficient in being crosslinked so that the pressure-sensitive-adhesive layer may not unfavorably satisfy endurance and adhesive properties. In the meantime, if the amount is more than 3 parts by weight, the pressure-sensitive-adhesive layer tends to become excessively hard to be lowered in endurance.

Isocyanate based crosslinking agents as described above may be used singly or in the form of a mixture of two or more thereof. The content of the entire crosslinking agent(s) is preferably from 0.01 to 2 parts by weight, more preferably from 0.02 to 2 parts by weight, even more preferably from 0.05 to 1.5 parts by weight for 100 parts by weight of the (meth)acryl-based polymer. The crosslinking agent(s) may be appropriately incorporated into the composition, considering the cohesive strength of the pressure-sensitive-adhesive layer, and the prevention of the peel in the endurance test.

Peroxides as described above may be used singly or in the foul of a mixture of two or more thereof. The content of the entire peroxide(s) is preferably from 0.01 to 2 parts by weight, more preferably from 0.04 to 1.5 parts by weight, even more preferably from 0.05 to 1 parts by weight for 100 parts by weight of the (meth)acryl-based polymer. The content is appropriately selected in these ranges to adjust, for example, the workability and the crosslinkage stability of the composition.

(4) Ionic Compound

The pressure-sensitive-adhesive composition of the present invention may further include an ionic compound. As the ionic compound, an alkali metal salt and/or an organic cation-anion salt is/are preferably used. As the alkali metal salt, organic salts and inorganic salts of an alkali metal may be used. The wording "organic cation-anion salt" referred to in the present invention denotes an organic salt having a cationic moiety made of an organic substance. An anionic moiety thereof may be made of an organic substance or an inorganic substance. The wording "organic cation-anion salt" is referred to also as an ionic liquid or ionic solid. The ionic compound is not particularly limited. Such a compound used in the present field is suitably usable. Examples thereof include ionic compounds described in JP-A-2015-4861. Out of these examples, preferred are lithium salts of (perfluoroalkylsulfonyl) imide, and more preferred is bis(trifluoromethanesulfonylimide) lithium. The proportion of the ionic compound is not particularly limited. The proportion may be set into any range as far as the advantageous effects of the present invention are not damaged. The amount of the ionic compound is, for example, preferably 10 parts by weight or less, more preferably 5 parts by weight or less, even more preferably 3 parts by weight or less, in particular preferably 1 part by weight or less for 100 parts by weight of the (meth)acryl-based polymer.

(5) Others

A polyether compound having a reactive silyl group may be blended into the pressure-sensitive-adhesive composition used in the present invention. The polyether compound can favorably improve the composition in re-workability. The polyether compound may be, for example, any polyether compound disclosed in JP-A-2010-275522. The addition amount thereof may be appropriately determined into any range as far as the advantageous effects of the present invention are not damaged.

The pressure-sensitive-adhesive composition of the present invention may further include known additives. For example, the following may be appropriately added to the composition in accordance with an article in which the composition is used: polyether compounds of a polyalkylene glycol such as polypropylene glycol; powder of a colorant or a pigment; dyes; surfactants; plasticizers; tackifiers; surface lubricants; leveling agents; softeners; antioxidants; antiaging agents; light stabilizers; ultraviolet absorbents; polymerization inhibitors; inorganic or organic fillers; metal powder; and granular or foil-piece-form substances. A redox system, to which a reducing agent is added, maybe used as far as the system is controllable. These additives are used in an amount that is preferably 5 parts by weight or less, more preferably 3 parts by weight or less, even more preferably 1 part by weight or less for 100 parts by weight of the (meth)acryl-based polymer.

The pressure-sensitive-adhesive composition of the present invention is suitably usable as a pressure-sensitive-adhesive composition for forming a pressure-sensitive-adhesive layer which is used, together with a transparent conductive substrate having a transparent conductive layer and a transparent substrate, in the state of being bonded to the transparent conductive layer.

2. Pressure-Sensitive-Adhesive Layer

The pressure-sensitive-adhesive layer of the present invention is famed from the above-mentioned pressure-sensitive-adhesive composition.

As described above, the pressure-sensitive-adhesive layer of the present invention can keep a high endurance even when exposed to a heated environment or allowed to stand still for a long term. This layer can favorably express a high endurance also when used together with a transparent conductive substrate having a transparent conductive layer and a transparent substrate in the state of being bonded to the transparent conductive layer.

When the pressure-sensitive-adhesive layer is formed, it is preferred to sufficiently consider effects of the crosslinking treatment temperature and the crosslinking treatment period, as well as adjust the amount of the whole of the crosslinking agent(s) added to the layer.

In accordance with the used crosslinking agent(s), the crosslinking treatment temperature and the crosslinking treatment period are adjustable. The crosslinking treatment temperature is preferably 170° C. or lower. The crosslinking treatment may be conducted at the same temperature as in the step of drying the pressure-sensitive-adhesive layer; or after the drying step, a separate crosslinking treatment step may be set up and performed. The crosslinking treatment period may be set, considering the producing performance or working performance of the layer-forming-process. The period is usually from about 0.2 to 20 minutes, preferably from about 0.5 to 10 minutes.

The method for forming the pressure-sensitive-adhesive layer is not particularly limited, and may be a method of applying the pressure-sensitive-adhesive composition onto a substrate that may be of various types, using a drying machine such as a hot oven to dry the workpiece to volatilize the solvent and others, optionally subjecting the workpiece to a crosslinking treatment as described above to form a pressure-sensitive-adhesive layer, and then transferring the pressure-sensitive-adhesive layer onto a polarizing film or transparent conductive substrate, which will be detailed later, or applying the pressure-sensitive-adhesive composition directly onto the same polarizing film or transparent conductive substrate as described above to form the target pressure-sensitive-adhesive layer. In the present invention, preferred is a method of producing a pressure-sensitive-adhesive-layer-attached polarizing film beforehand in which the pressure-sensitive-adhesive layer is formed on a polarizing film, and then bonding the pressure-sensitive-adhesive-layer-attached polarizing film onto a transparent conductive substrate.

The substrate is not particularly limited. The substrate may be a substrate that may be of various types, such as a release film, a transparent resin film substrate, and a polarizing film, which will be detailed later.

As the method for applying the pressure-sensitive-adhesive composition onto the substrate or polarizing film, various methods may be used. Specific examples thereof are extrusion coating methods such as a fountain coater, roll coating, kiss roll coating, gravure coating, reverse coating, roll brush coating, spray coating, dip roll coating, bar coating, knife coating, air knife coating, curtain coating, lip coating, or a die coater.

The drying conditions (temperature and period) are not particularly limited, and may be appropriately set in accordance with, for example, the composition and the concentration of the pressure-sensitive-adhesive composition. The temperature is, for example, from 80 to 170° C., preferably from 90 to 200° C., and the period is from 1 to 60 minutes, preferably from 2 to 30 minutes.

After the drying, the workpiece may be optionally subjected to crosslinking treatment. Conditions therefor are as described above.

The thickness of the (dried) pressure-sensitive-adhesive layer is, for example, preferably from 5 to 100 µm, more preferably from 7 to 70 µm, even more preferably from 10 to 50 µm. If the thickness of the pressure-sensitive-adhesive layer is less than 5 µm, the layer tends to become poor in tackiness onto an adherend to be insufficient in endurance under humidified conditions. In the meantime, if the thickness of the pressure-sensitive-adhesive layer is more than 100 µm, the pressure-sensitive-adhesive composition is not sufficiently dried when applied and dried to form the pressure-sensitive-adhesive layer; thus, forms remains in the layer or thickness unevenness is generated in the pressure-sensitive-adhesive layer surfaces. Consequently, a problem about the external appearance of the layer tends to become apparent with ease.

Examples of a constituent of the above-mentioned release film include resin films such as polyethylene, polypropylene, polyethylene terephthalate and polyester films, porous matters such as paper, fabric and nonwoven fabric pieces, nets, formed sheets, metal foil pieces, laminates each made of two or more of these examples, and other appropriate thin pieces. The resin film is preferably used since the film is excellent in surface smoothness.

Examples of the resin film include polyethylene film, polypropylene film, polybutene film, polybutadiene film, polymethylpentene film, polyvinyl chloride film, vinyl chloride copolymer film, polyethylene terephthalate film, polybutylene terephthalate film, polyurethane film, and ethylene-vinyl acetate copolymer film.

The thickness of the release film is usually from 5 to 200 µm, preferably from about 5 to 100 µm. The release film may be optionally subjected to releasing treatment and antifouling treatment with, for example, a silicone based, fluorine-containing based, long-chain-alkyl based or aliphatic acid amide based release agent, or silica powder, and/or antistatic treatment in, for example, a painting, kneading-in or vapor deposition manner. By subjecting the surface(s) of the release film appropriately to, particularly, peeling treatment, such as silicone treatment, long-chain alkyl treatment or fluorine treatment, this film can be made higher in peeling property from the pressure-sensitive-adhesive layer.

The transparent resin film substrate is not particularly limited, and may be a transparent resin film that maybe of various types. The resin film is made of a monolayered film. Examples of the raw material thereof include polyester based resins such as polyethylene terephthalate and polyethylene naphthalate, acetate based resins, polyethersulfone based resins, polycarbonate based resins, polyamide based resins, polyimide based resins, polyolefin based resins, (meth)acrylic resins, polyvinyl chloride based resins, polyvinylidene chloride based resins, polystyrene based resins, polyvinyl alcohol based resins, polyarylate based resins, and polyphenylene sulfide based resins. Out of these based resins, particularly preferred are polyester based resins, polyimide based resins and polyethersulfone based resins.

The thickness of the film substrate is preferably from 15 to 200 µm.

3. Pressure-Sensitive-Adhesive-Layer-Attached Polarizing Film

The pressure-sensitive-adhesive-layer-attached polarizing film of the present invention has the above-defined pressure-sensitive-adhesive layer over at least one surface of a polarizing film.

The method for forming the pressure-sensitive-adhesive layer is as described above.

The polarizing film is not particularly limited, and is generally a polarizing film having a transparent protective film or transparent protective films on one surface or both surfaces of a polarizer.

The polarizer is not particularly limited, and may be a polarizer that may be of various types. The polarizer may be, for example, a polarizer yielded by causing a dichroic substance, such as iodine or a dichroic dye, to be adsorbed into a hydrophilic polymeric film, such as a polyvinyl alcohol based film, a polyvinyl alcohol based film converted partially to formal or a partially saponified ethylene/vinyl acetate copolymer based film, and then stretching the resultant uniaxially; or a polyene based oriented film of, for example, a polyvinyl-alcohol-dehydrated product or a polyvinyl chloride de-hydrochloride-treated product. Out of such examples, preferred is a polarizer composed of a polyvinyl alcohol based film and a dichroic substance such as iodine. More preferred is an iodine-containing polarizer containing iodine and/or an iodine ion. The thickness of these polarizers is not particularly limited, and is generally from about 5 to 80 µm.

The polarizer yielded by dyeing a polyvinyl alcohol based film with iodine, and then stretching the resultant uniaxially may be produced, for example, by immersing a polyvinyl alcohol into an aqueous solution of iodine to dye the polyvinyl alcohol, and then stretching the resultant into a length 3 to 7 times the original length. The polyvinyl alcohol may be immersed into, for example, an aqueous solution of potassium iodine that may optionally contain, for example, boric acid, zinc sulfate or zinc chloride. Furthermore, before the dyeing, the polyvinyl alcohol film may be optionally immersed into water to be cleaned therewith. The cleaning of the polyvinyl alcohol based film with water makes it possible to clean away stains and an anti-blocking agent on the outer surface(s) of the polyvinyl alcohol based film. Furthermore, the polyvinyl alcohol based film is swollen to produce an advantageous effect of preventing dyeing-unevenness or some other unevenness. After or while dyed with iodine, the film may be stretched. Alternatively, after stretched, the film may be dyed with iodine. The stretching may be performed in an aqueous solution of, for example, boric acid or potassium iodide, or in a water bath.

In the present invention, a thin polarizer of 10 μm or less in thickness may be used. From the viewpoint of making the pressure-sensitive-adhesive-layer-attached polarizing film thinner, the thickness is preferably from 1 to 7 μm. Such a thin polarizer is preferred since the polarizer is small in thickness unevenness, is excellent in visibility, and is small in dimension change to be excellent in endurance, and can further make the resultant polarizing film also small in thickness.

Typical examples of the thin polarizer include thin polarizing membranes described in JP-A-S51-069644, JP-A-2000-338329, WO 2010/100917 pamphlet, Japanese Patent No. 4751481, or JP-A-2012-073563. These thin polarizing membranes can each be obtained by a producing method including the step of stretching a polyvinyl alcohol based resin (hereinafter referred to also as a PVA based resin) layer and a resin substrate for stretching in a laminated state, and the step of dyeing the workpiece. Even when the PVA based resin layer is thin, this producing method makes it possible to stretch the layer without undergoing any inconvenience based on the stretching, such as breaking, by the matter that the layer is supported on the resin substrate for stretching.

The thin polarizing membrane is preferably a membrane obtained by the following producing method, out of producing methods including the step of stretching the laminated-state members and the step of dyeing the resultant, since the laminate can be stretched into a high stretch ratio to improve the resultant in polarizing performance: a method including the step of stretching the members in an aqueous solution of boric acid, as described in WO 2010/100917 pamphlet, Japanese Patent No. 4751481, or JP-A-2012-073563. Particularly preferred is a thin polarizing membrane yielded by the producing method including the step of stretching the members auxiliarily in the air before the stretching in the aqueous solution of boric acid, as described in Japanese Patent No. 4751481, or JP-A-2012-073563.

The material for forming the transparent protective film laid on one or each of the two surfaces of the polarizer may be, for example, a thermoplastic resin excellent in transparency, mechanical strength, thermal stability, water blocking performance, isotropy, and others. Specific examples of such a thermoplastic resin include cellulose resins such as triacetylcellulose, polyester resins, polyethersulfone resins, polysulfone resins, polycarbonate resins, polyamide resins, polyimide resins, polyolefin resins, (meth)acrylic resins, cyclic polyolefin resins (norbornene based resins), polyarylate resins, polystyrene resins and polyvinyl alcohol resins; and any mixture of two or more thereof. The transparent protective film is bonded onto one of the two sides of the polarizer through an adhesive layer. As a transparent protective film on the other side, a thermosetting resin or ultraviolet-ray curing-type resin may be used, examples thereof including (meth)acrylic, urethane, acrylic urethane, epoxy and silicone based resins. Each of the transparent protective films may contain one or more arbitrarily-selected appropriate additives. Examples of the additives include ultraviolet absorbents, antioxidants, lubricants, plasticizers, release agents, anti-coloring agents, flame retardants, nucleating agents, antistatic agents, pigments, and colorants. The content of the thermoplastic resin in the transparent protective film is preferably from 50 to 100% by weight, more preferably from 50 to 99% by weight, even more preferably from 60 to 98% by weight, in particular preferably from 70 to 97% by weight. If the content of the thermoplastic resin in the transparent protective film is 50% by weight or less, it is feared that a high transparency and others that the thermoplastic resin originally has cannot be sufficiently expressed.

The thickness of the protective film may be appropriately determined. The thickness is generally from about 1 to 500 μm from the viewpoint of the workabilities of the film, such as the strength and handleability, and the thin film property of the film.

The polarizer and the protective film are usually caused to adhere closely onto each other through, for example, a water-based adhesive. Examples of the water-based adhesive include isocyanate based adhesives, polyvinyl alcohol based adhesives, gelatin based adhesives, vinyl latex based adhesives, water based polyurethanes, and water based polyesters. Examples of the adhesive for the polarizer and the transparent protective film include, besides the above-mentioned adhesives, ultraviolet-ray curing-type adhesives, and electron-beam curing-type adhesives. The electron-beam curing-type adhesives, for polarizing films, show adhesion suitable for the above-mentioned various transparent protective films. The adhesive used in the present invention may contain a metal compound filler.

In the present invention, instead of the transparent protective film of the polarizing film, for example, a retardation film can be formed on the polarizer. On the transparent protective film, another transparent protective film or, for example, a retardation film can be laid.

The transparent protective film surface onto which the polarizer is not bonded may be subjected to a hard coat layer or anti-reflection treatment, or a treatment for sticking-prevention or for diffusion or anti-glare.

The pressure-sensitive-adhesive-layer-attached polarizing film may have an anchor layer between the polarizing film and the pressure-sensitive-adhesive layer. The material for forming the anchor layer is not particularly limited. Examples thereof include various polymers, respective sols of metal oxides, and silica sol. Out of these examples, particularly preferred are polymers. The use form of each of the polymers may be any one of solvent-soluble, water-dispersible, and water-soluble forms.

Examples of the polymers include polyurethane based resins, polyester based resins, acrylic based resins, polyether based resins, cellulose based resins, polyvinyl alcohol based resins, polyvinyl pyrrolidone, and polystyrene based resins.

When the pressure-sensitive-adhesive layer of the pressure-sensitive-adhesive-layer-attached polarizing film is exposed, the pressure-sensitive-adhesive layer may be protected by a release film (separator) until the polarizing film is put into practical use. The release film may be the same as described above. In a case where in the production of the pressure-sensitive-adhesive layer, as its substrate a release film is used, the pressure-sensitive-adhesive layer on the release film may be bonded to a polarizing film; in this case, this release film is usable as a release film for the pressure-sensitive-adhesive layer of the resultant pressure-sensitive-adhesive-layer-attached polarizing film. Thus, the process can be made simple.

The pressure-sensitive-adhesive-layer-attached polarizing film of the present invention is usable, together with a transparent conductive substrate having a transparent conductive layer and a transparent substrate, in the state of contacting the transparent conductive layer. The transparent conductive substrate will be detailed later.

4. Image Display Device

The image display device of the present invention includes: the above-defined pressure-sensitive-adhesive-layer-attached polarizing film; and a liquid crystal cell including a transparent conductive substrate having a transparent conductive layer and a transparent substrate;

wherein the pressure-sensitive-adhesive layer of the pressure-sensitive-adhesive-layer-attached polarizing film is bonded to the transparent conductive layer of the liquid crystal cell.

The pressure-sensitive-adhesive-layer-attached polarizing film is as described above.

The constituent material of the transparent conductive layer of the transparent conductive substrate is not particularly limited, and may be a metal oxide of at least one metal selected from the group consisting of indium, tin, zinc, gallium, antimony, titanium, silicon, zirconium, magnesium, aluminum, gold, silver, copper, palladium, and tungsten. The metal oxide may optionally include any one of the metal atoms described in this group. Preferred is the use of, for example, indium oxide including tin oxide (ITO) or tin oxide including antimony. The use of ITO is particularly preferred. ITO preferably includes 80 to 99% by weight of indium oxide, and 1 to 20% by weight of tin oxide.

The compound ITO may be crystalline ITO, or amorphous ITO. Each of the two ITO species is preferably usable.

The thickness of the transparent conductive layer is not particularly limited, and is preferably 10 nm or more, more preferably from 15 to 40 nm, even more preferably from 20 to 30 nm.

The method for forming the transparent conductive layer is not particularly limited, and may be a method known in the prior art. Specific examples thereof include vacuum evaporation, sputtering, and ion plating methods. In accordance with a required thickness of the film, an appropriate method may also be adopted.

The transparent substrate is sufficient to be a substrate having transparency. The material thereof is not particularly limited. The transparent substrate may be, for example, a glass or transparent resin film substrate. The transparent resin film substrate may be the same as described above.

Between the transparent conductive layer and the transparent substrate, for example, an under coat layer and/or an oligomer prevention layer may be laid.

Figure 1:
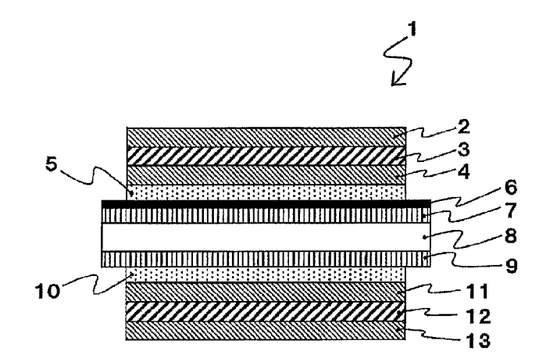
FIG. 1 is a schematic view which schematically illustrates an embodiment of a liquid crystal panel usable in the present invention.

The liquid crystal cell used in the image display device of the present invention is a liquid crystal cell having the above-mentioned transparent conductive substrate. The transparent conductive substrate is usually provided to the viewing side surface of the liquid crystal cell. With reference to FIG. 1, a description will be made about a liquid crystal panel including a liquid crystal cell usable in the present invention. However, the present invention is not limited to FIG. 1.

An embodiment of a liquid crystal panel 1, which can be included in the scope of the image display device of the present invention, may have a structure composed of the following members: a viewing side transparent protective film 2/a polarizer 3/a liquid crystal cell side transparent protective film 4/a pressure-sensitive-adhesive layer 5/a transparent conductive layer 6/a transparent substrate 7/a liquid crystal layer 8/a transparent substrate 9/a pressure-sensitive-adhesive layer 10/a liquid crystal cell side transparent protective film 11/a polarizer 12/a light source side transparent protective film 13, which are arranged in an order described herein from the viewing side of the structure. In FIG. 1, a pressure-sensitive-adhesive-layer-attached polarizing film of the present invention corresponds to the viewing side transparent protective film 2/the polarizer 2/the liquid crystal cell side transparent protective film 3/the pressure-sensitive-adhesive layer 5. In FIG. 1, a transparent conductive substrate used in the present invention is composed of the transparent conductive layer 6/the transparent substrate 7. In FIG. 1, a transparent-conductive-substrate-attached liquid crystal cell used in the present invention is composed of the transparent conductive layer 6/the transparent substrate 7/the liquid crystal layer 8/the transparent substrate 9.

Besides the above-mentioned constituents, the following may be appropriately provided to the liquid crystal panel 1: a retardant film, a viewing angle compensation film, a brightness enhancement film, or any other optical film.

The liquid crystal layer 8 is not particularly limited, and may be a liquid crystal layer in any mode such as a TN, STN, π, VA, or IPS mode. The (light source side) transparent substrate 9 is sufficient to be a substrate having transparency, and the material thereof is not particularly limited. The transparent substrate 9 is, for example, a glass or transparent resin film substrate. The transparent resin film substrate may be the same as described above.

The light source side pressure-sensitive-adhesive layer 10, the liquid crystal cell side transparent protective film 11, the polarizer 12 and the light source side transparent protective film 13 may be ones used conventionally in the present field. Those described in the present description are also preferably usable.

The liquid crystal panel 1 is a panel in which a pressure-sensitive-adhesive-layer-attached polarizing film of the present invention is laminated onto the transparent conductive layer 6, which is formed as an outermost layer on the viewing side of the liquid crystal cell to bring the transparent conductive layer 6 of the liquid crystal cell into contact with the pressure-sensitive-adhesive layer 5 of the pressure-sensitive-adhesive-layer-attached polarizing film.

The image display device of the present invention is sufficient to be an image display device including a pressure-sensitive-adhesive-layer-attached polarizing film of the present invention, and a liquid crystal cell equipped with a transparent conductive substrate having a transparent conductive layer over a transparent substrate. The image display device preferably includes the liquid crystal panel described just above. Hereinafter, as an example of the device, a description will be made about a liquid crystal display device. However, the present invention is not limited to this example.

Specific examples of an image display device to which the liquid crystal panel is applicable include liquid crystal display devices, electroluminescence (EL) displays, plasma displays (PDs), and field emission displays (FEDs).

The image display device of the present invention is sufficient to be an image display device including a pressure-sensitive-adhesive-layer-attached polarizing film of the present invention, and a liquid crystal cell equipped with a transparent conductive substrate having a transparent conductive layer over a transparent substrate. Other constituents of the device may be the same as in any conventional image display device.

EXAMPLES

Hereinafter, the present invention will be specifically described by way of examples thereof. However, the present invention is not limited to the examples. Conditions for allowing any member to stand still at room temperature are 23° C. and 65% R.H. unless otherwise specified.

<Measurement of Weight-Average Molecular Weight of (Meth) Acryl-Based Polymer>

The weight-average molecular weight (Mw) of any (meth)acryl-based polymer is measured by GPC (gel permeation chromatography). The Mw/Mn ratio is also measured in the same way.

Analyzer: HLC-8120 GPC, manufactured by Tosoh Corporation

Columns: G7000HXL+GMHXL+GMHXL, each manufactured by Tosoh Corporation

Column size: each of the columns that has a size of 7.8 mm diameter and 30 cm; total: 90 cm Column temperature: 40° C.

Flow rate: 0.8 mL/min.

Injected amount: 100 μL

Eluent: tetrahydrofuran

Detector: refractive index detector (RI)

Standard sample: polystyrene.

Production Example 1

Production of Polarizing Film

A polyvinyl alcohol film of 80 μm in thickness was stretched to a stretch ratio of 3 between rolls different in velocity ratio from each other while dyed in an iodine solution having a concentration of 0.3% by weight at 30° C. for 1 minute. Thereafter, the film was stretched to a total stretch ratio of 6 while immersed into an aqueous solution containing boric acid at a concentration of 4% by weight and potassium iodide at a concentration of 10% by weight at 60° C. for 0.5 minute. Next, the film was immersed into an aqueous solution containing potassium iodide at a concentration of 1.5% by weight at 30° C. for 10 seconds to be washed. Thereafter, the film was dried at 50° C. for 4 minutes to yield a polarizer of 30 μm in thickness. Triacetylcellulose films subjected to saponifying treatment and each having a thickness of 80 μm were bonded, respectively, to both surfaces of the polarizer through a polyvinyl alcohol based adhesive to produce a polarizing film.

Production Example 2

Preparation of Acrylic Polymer (a-1) Solution

Into a four-necked flask equipped with an impeller, a thermometer, a nitrogen-gas-introducing tube and a condenser was charged a monomer mixture containing 99 parts by weight of butyl acrylate and 1 part by weight of 4-hydroxybutyl acrylate. Furthermore, to 100 parts by weight of (any solid in) the monomer mixture was charged 0.1 part by weight of 2,2'-azobisisobutyronitrile as a polymerization initiator together with 100 parts by weight of ethyl acetate. While this reaction system was gently stirred, nitrogen gas was introduced thereinto to purge the inside in the flask with nitrogen. Thereafter, the temperature of the liquid inside the flask was kept at about 55° C. to cause the monomer components to undergo polymerization reaction for 8 hours to prepare a solution of an acrylic polymer (a-1) having a weight-average molecular weight (Mw) of 1,560,000 and a Mw/Mn ratio of 3.2.

Production Examples 3 to 5

Acrylic polymer (a-2) to (a-4) solutions were each prepared in the same way as in Production Example 2 except that in Production Example 2, the monomer species used to prepare the acrylic polymer, and the respective proportions of the species were changed as shown in Table 1.

TABLE 1

| Acrylic | polymer | Blend amounts (part(s) by weight) | | | | MW | Mw/Mn |
|---|---|---|---|---|---|---|---|
| | | BA | NVP | AA | HBA | | |
| Production example 2 | (a-1) | 99 | — | — | 1 | 156 | 3.2 |
| Production example 3 | (a-2) | 99.3 | — | 0.3 | 0.4 | 162 | 3.4 |
| Production example 4 | (a-3) | 99.3 | 1.5 | — | 0.4 | 161 | 3.5 |
| Production example 5 | (a-4) | 97.8 | 1.5 | 0.3 | 0.4 | 155 | 3.7 |

Abbreviations in Table 1 are each as follows.
BA: butyl acrylate
NVP: N-vinyl-2-pyrrolidone
AA: acrylic acid
HBA: 4-hydroxybutyl acrylate Example 1

(Preparation of Acrylic Pressure-Sensitive-Adhesive Composition)

Into 100 parts by weight of the solid in the acrylic polymer (a-1) solution yielded in Production example 2 were blended 0.1 part of an isocyanate crosslinking agent (trimethylolpropanehexamethylene diisocyanate; trade name: TAKENATE D160N, manufactured by Mitsui Chemicals, Inc.), 0.3 part of benzoyl peroxide (NYPER BMT 40SV, manufactured by NOF Corporation), and 0.3 part of an oligomer epoxy-group-containing silane coupling agent (trade name: X-41-1059A, manufactured by Shin-Etsu Chemical Co., Ltd.; alkoxy group amount proportion: 43% by weight, and epoxy equivalent: 350 mg/mol) to prepare a solution of an acrylic pressure-sensitive-adhesive composition.

(Production of Pressure-Sensitive-Adhesive-Layer-Attached Polarizing Film)

The acrylic pressure-sensitive-adhesive composition solution was coated onto one surface of a polyethylene terephthalate film (separator film; trade name: MRF38, manufactured by Mitsubishi Polyester Film, Inc.) treated with a silicone release agent to give a pressure-sensitive-adhesive layer having a thickness of 23 μm after the workpiece was to be dried. The workpiece was then dried at 155° C. for 1 minute. In this way, the pressure-sensitive-adhesive layer was formed on the surface of the separator film. Next, the pressure-sensitive-adhesive layer formed on the separator film was transferred onto the polarizing film produced in Production Example 1 to produce each pressure-sensitive-adhesive-layer-attached polarizing film.

Examples 2 to 10, and Comparative Examples 1 to 8

In each of these examples, a solution of an acrylic pressure-sensitive-adhesive composition was prepared in the same way as in Example 1 except that in Example 1, one or more factors of kind of the acrylic polymer, kind of the silane coupling agent, and respective addition amounts thereof were changed as shown in Table 2. In Example 10, an ionic compound was blended into the composition in a proportion shown in Table 2. The resultant acrylic pressure-sensitive-adhesive composition for each of the examples was used to produce each pressure-sensitive-adhesive-layer-attached polarizing film in the same manner as in Example 1.

About the pressure-sensitive-adhesive-layer-attached polarizing films yielded in the examples and the comparative examples, evaluations described below were made. The evaluation results are shown in Table 2.

<Endurance Test Immediately After Coating>

One of the pressure-sensitive-adhesive-layer-attached polarizing films yielded in each of the working examples and the comparative examples was cut into each sample of 15 inches in size. A laminator was used to bond each of two of the samples to an ITO-layer-attached glass piece having an amorphous ITO layer on a non-alkali glass piece (trade name: EG-XG, manufactured by Corning Inc.) of 0.7 mm thickness provided that the sample was bonded onto the ITO layer. Next, the workpiece was subjected to autoclave treatment at 50° C. and 0.5 MPa for 15 minutes to cause the sample to adhere completely closely onto the ITO-layer-attached glass piece. The two samples subjected to this treatment were treated in atmospheres of 80° C. and 85° C. temperatures, respectively, for 500 hours (heating test). Thereafter, the external appearance between the polarizing film and the ITO-layer-attached glass piece of each of the samples was visually evaluated in accordance with a criterion described below. Each of the ITO layers was famed by sputtering. About the composition of the compound ITO, the proportion of Sn was 3% by weight. Before the bonding of each of the samples, the sample was put into a heating step at 140° C. for 60 minutes. The proportion of Sn of ITO was calculated out in accordance with the expression, Sn atom weight/(Sn atom weight+In atom weight).

(Evaluation Criterion)

⊙: A change in the external appearance, such as a peel, was not caused at all.

○: An edge of the sample was slightly peeled, but no problem was caused for practical use.

Δ: An edge of the sample was peeled, but no problem was caused for practical use unless the sample was used for an special purpose.

×: An edge of the sample was remarkably peeled so that a problem was caused for practical use.

<Endurance Test After Long-Term Storage (12 months)>

One of the pressure-sensitive-adhesive-layer-attached polarizing films yielded in each of the examples and the comparative examples was stored at 23° C. and 55% R.H. for 12 months. An endurance test after the long-term storage was carried out in the same way as in the item <Endurance Test Immediately after Coating> except that the pressure-sensitive-adhesive-layer-attached polarizing film stored over the 12 months was used. The resultant samples were evaluated in accordance with the same evaluating criterion as in the item <Endurance Test Immediately after Coating>.

TABLE 2

| | Pressure-sensitive-adhesive composition | | | | | | | | | | |
|---|---|---|---|---|---|---|---|---|---|---|---|
| | | Crosslinking agents | | Silane coupling agent | | | | Ionic compound (part by weight) | Endurance test immediately after coating | | Endurance test after 12 months |
| | (meth)acryl-based polymer | Isocyanate based (part by weight) | Peroxide based (part by weight) | kind | Epoxy equivalent (g/mol) | Monomer or oligomer | Addition amount (part(s) by weight) | | 80° C. | 85° C. | 80° C. | 85° C. |
| Example 1 | (a-1) | 0.1 | 0.3 | X-41-1059A | 350 | Oligomer | 0.3 | — | ○ | ○ | ○ | Δ |
| Example 2 | (a-1) | 0.1 | 0.3 | X-41-1056 | 280 | Oligomer | 0.3 | — | ⊙ | ⊙ | ○ | ○ |
| Example 3 | (a-1) | 0.1 | 0.3 | X-41-1058 | 280 | Oligomer | 0.05 | — | ○ | ⊙ | ○ | Δ |
| Example 4 | (a-1) | 0.1 | 0.3 | X-41-1056 | 280 | Oligomer | 1 | — | ○ | ⊙ | ○ | Δ |
| Example 5 | (a-1) | 0.1 | 0.3 | X-41-1056 | 280 | Oligomer | 6 | — | ○ | Δ | ○ | Δ |
| Example 6 | (a-2) | 0.1 | 0.3 | X-41-1056 | 280 | Oligomer | 0.3 | — | ⊙ | ⊙ | ⊙ | ○ |
| Example 7 | (a-3) | 0.1 | 0.3 | X-41-1056 | 280 | Oligomer | 0.3 | — | ⊙ | ⊙ | ⊙ | ○ |
| Example 8 | (a-4) | 0.1 | 0.3 | X-41-1056 | 280 | Oligomer | 0.3 | — | ⊙ | ⊙ | ⊙ | ⊙ |
| Example 9 | (a-4) | 0.1 | 0.3 | X-41-1059A | 350 | Oligomer | 0.3 | — | ⊙ | ⊙ | ⊙ | ○ |
| Example 10 | (a-4) | 0.1 | 0.3 | X-41-1056 | 280 | Oligomer | 0.3 | 1 | ⊙ | ⊙ | ⊙ | ⊙ |
| Comparative example 1 | (a-1) | 0.1 | 0.3 | — | — | — | — | — | X | X | X | X |
| Comparative example 2 | (a-1) | 0.1 | 0.3 | KBM403 | 236 | Monomer | 0.3 | — | Δ | Δ | X | X |
| Comparative example 3 | (a-1) | 0.1 | 0.3 | X-41-1053 | 830 | Oligomer | 0.3 | — | ○ | ○ | X | X |
| Comparative example 4 | (a-1) | 0.1 | 0.3 | X-41-1810 | — | Oligomer | 0.3 | — | Δ | Δ | X | X |
| Comparative example 5 | (a-2) | 0.1 | 0.3 | — | — | — | — | — | X | X | X | X |
| Comparative example 6 | (a-2) | 0.1 | 0.3 | KBM403 | 236 | Monomer | 0.3 | — | ○ | Δ | X | X |

TABLE 2-continued

| | Pressure-sensitive-adhesive composition | | | | | | | | | | | |
|---|---|---|---|---|---|---|---|---|---|---|---|---|
| | | Crosslinking agents | | Silane coupling agent | | | Addition amount (part(s) by weight) | Ionic compound (part by weight) | Endurance test immediately after coating | | Endurance test after 12 months | |
| | (meth)acryl-based polymer | Isocyanate based (part by weight) | Peroxide based (part by weight) | kind | Epoxy equivalent (g/mol) | Monomer or oligomer | | | 80° C. | 85° C. | 80° C. | 85° C. |
| Comparative example 7 | (a-3) | 0.1 | 0.3 | — | — | — | — | — | X | ○ | X | X |
| Comparative | (a-4) | 0.1 | 0.3 | F41-1053 | 830 | Oligomer | 0.3 | — | ○ | ○ | Δ | X |

Abbreviations in Table 2 are each as follows.
(a-1): acrylic polymer (a-1) yielded in Production example 2
(a-2): acrylic polymer (a-2) yielded in Production example 3
(a-3): acrylic polymer (a-3) yielded in Production example 4
(a-4): acrylic polymer (a-4) yielded in Production example 5
Isocyanate based: trimethylolpropanehexamethylene diisocyanate, trade name TAKENATE D160N, manufactured by Mitsui Chemicals, Inc.
Peroxide based: benzoyl peroxide, trade name: NYPER BMT 40SV, manufactured by NOF Corporation
X-41-1056: oligomer epoxy-group-containing silane coupling agent, manufactured by Shin-Etsu Chemical Co., Ltd.; alkoxy group amount proportion: 17% by weight, and epoxy equivalent: 280 g/mol
X-41-1059A: oligomer epoxy-group-containing silane coupling agent, manufactured by Shin-Etsu Chemical Co., Ltd.; alkoxy group amount proportion: 43% by weight, and epoxy equivalent: 350 g/mol
X-41-1053: oligomer epoxy-group-containing silane coupling agent, manufactured by Shin-Etsu Chemical Co., Ltd.; alkoxy group amount proportion: 50% by weight, and epoxy equivalent: 830 g/mol
KBM403: γ-glycidoxypropylmethoxysilane, manufactured by Shin-Etsu Chemical Co., Ltd.; epoxy equivalent: 236 g/mol
X-41-1810: oligomer type mercapto-group-containing silane coupling agent, manufactured by Shin-Etsu Chemical Co., Ltd.
Ionic compound: bis(trifluoromethanesulfonylimide) lithium, manufactured by Mitsubishi Materials Corporation.

DESCRIPTION OF REFERENCE SIGNS

1: Liquid crystal panel
2: Viewing side transparent protective film
3: Polarizer
4: Liquid crystal cell side transparent protective film
5: Pressure-sensitive-adhesive layer
6: Transparent conductive layer
7: Transparent substrate
8: Liquid crystal layer
9: Transparent substrate
10: Pressure-sensitive-adhesive layer
11: Liquid crystal cell side transparent protective film
12: Polarizer
13: Light source side transparent protective film

The invention claimed is:

1. An image display device, comprising: a pressure-sensitive-adhesive-layer-attached polarizing film; and a liquid crystal cell comprising a transparent conductive substrate having a transparent conductive layer and a transparent substrate;
wherein the pressure-sensitive-adhesive-layer-attached polarizing film comprises a polarizing film and a pressure-sensitive-adhesive layer for transparent conductive layer,
wherein the pressure-sensitive-adhesive layer for transparent conductive layer is formed from a pressure-sensitive-adhesive composition, comprising a (meth)acryl-based polymer, a crosslinking agent and an oligomer epoxy-group-containing silane coupling agent having an epoxy equivalent of 250 to 600 g/mol,
the silane coupling agent has, in a molecule thereof, two or more alkoxysilyl groups, and an alkoxy group amount of 10 to 50% by weight of the silane coupling agent,
wherein the (meth)acryl-based polymer has a weight-average molecular weight of 1,200,000 to 2,500,000, and a molecular weight distribution of 1.8 to 5, and comprises, as monomer units thereof, 70% or more by weight of an alkyl (meth)acrylate; a hydroxyl-group-containing monomer and an N-vinyl-group-containing lactam monomer, and
wherein the pressure-sensitive-adhesive layer for transparent conductive layer of the pressure-sensitive-adhesive-layer-attached polarizing film is bonded to the transparent conductive layer of the liquid crystal cell.

2. The image display device according to claim 1, wherein the blend amount of the silane coupling agent is from 0.01 to 3 parts by weight for 100 parts by weight of the (meth)acryl-based polymer.

3. The image display device according to claim 1, wherein the (meth)acryl-based polymer further comprises, as the monomer units, a carboxyl-group-containing monomer.

4. The image display device according to claim 1, wherein the blend amount of the crosslinking agent is from 0.01 to 3 parts by weight for 100 parts by weight of the (meth)acryl-based polymer.

5. The image display device according to claim 1, wherein the silane coupling agent has an alkoxy group amount of 20 to 40% by weight of the silane coupling agent.

6. The image display device according to claim 1, wherein a constituent material of the transparent conductive layer is an electrically conductive metal oxide.

7. The image display device according to claim 1, wherein the (meth)acryl-based polymer comprises 0.01 to 3% by weight of the hydroxyl-group-containing monomer and 0.1 to 5% of the N-vinyl-group-containing lactam monomer.

* * * * *